March 1, 1938. E. C. FANNING 2,109,742
BLOWER
Filed Sept. 17, 1935
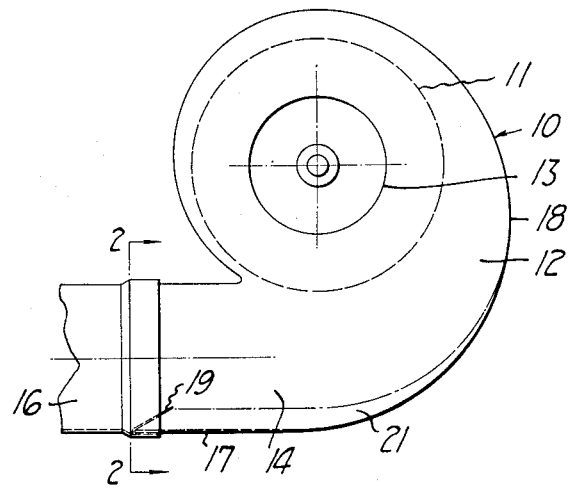
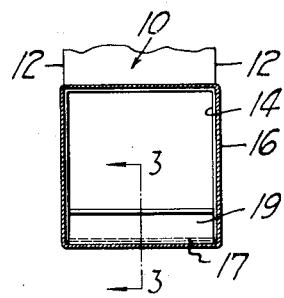
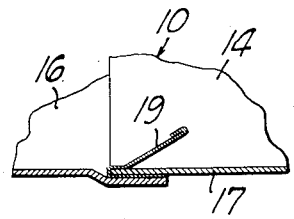
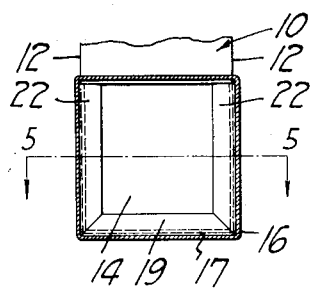
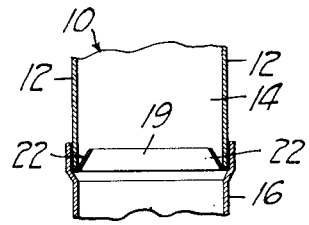
INVENTOR.
Erroll C. Fanning
BY Paul D. Flehr
ATTORNEY.

Patented Mar. 1, 1938

2,109,742

UNITED STATES PATENT OFFICE 2,109,742

BLOWER

Erroll C. Fanning, Berkeley, Calif., assignor to Atlas Heating & Ventilating Co. Ltd., San Francisco, Calif., a corporation of California Application September 17, 1935, Serial No. 40,915

2 Claims. (Cl. 230—232)

This invention relates generally to blowers such as are employed in various appliances to secure a forced draft or circulation of air. It has particular application to installations where noise is objectionable, as for example where the blower is employed for use with hot air furnaces, and ventilating or air conditioning equipment.

Many refinements have been made in blower constructions, to minimize noise and vibration. For example, rubber mounted bearings and motors, together with carefully designed low speed rotors, have alleviated the problem of noise to a considerable extent. However, even with such refinements, discharge of air from a conventional type of blower is accompanied by an objectionable swishing noise. By a conventional type of blower, I have reference to one having a sheet metal housing contoured in accordance with an Archimedes spiral. While the swishing noise may originate in part through turbulent flow of air from the rotor blades, I attribute it mainly to rapid flow of air into contact with the inner peripheral surface of the housing. Such noise is particularly objectionable in hot air furnaces or in air conditioning equipment, in that it travels along the air stream and is projected into the room being heated or ventilated.

It is an object of the present invention to provide a simple type of blower which will substantially entirely minimize the objectionable swishing noise, referred to above.

Further objects of the invention will appear in the following description, in which the preferred embodiments of the invention have been set forth in detail in conjunction with the accompanying drawing.

Referring to the drawing:

Fig. 1 is a side elevational view, illustrating a blower constructed in accordance with the present invention.

Fig. 2 is a cross sectional view, taken along the line 2—2 of Fig. 1.

Fig. 3 is an enlarged cross sectional detail, taken along the line 3—3 of Fig. 2.

Fig. 4 is a cross sectional view similar to Fig. 2 but showing a modified form.

Fig. 5 is a cross sectional view taken along the line 5—5 of Fig. 4.

The blower illustrated in the drawing consists of a housing 10, formed of suitable material such as sheet metal, in conjunction with a rotor 11. The rotor is of course carried by suitable journals, and is connected to an electric motor or like source of power. The side walls 12 of the housing are provided with air inlet openings 13, while the discharge conduit 14, provided by the housing, is adapted to be connected to the air conducting means, such as a conduit 16. It will be noted that the housing is contoured in accordance with an Archimedes spiral, with the wall 17 of the discharge conduit 14 being a tangential extension of the peripheral housing wall 18.

The means provided for substantially entirely suppressing the swishing noise, which is deemed largely caused by flow of air along the inner surface of walls 17 and 18, consists of a baffle 19. As will be evident from Figs. 2 and 3, this baffle 19 is of sufficient length to extend across the wall 17, and it also extends upwardly from this wall a substantial distance into the stream of discharging air. Instead of having the general plane of this baffle disposed at right angles to the plane of wall 17, it is preferable to incline it against the stream of air, as illustrated in Fig. 3. While the location of baffle 19 may vary, it has been found convenient to attach it to the forward edge of the wall 17, as shown in Fig. 3.

Without wishing to confine myself to a precise theory of operation, the baffle described above appears to function as follows: When the blower is in operation it has been observed that a dead air space 21 is created in front of the baffle 19, which extends for a substantial distance into the blower housing and along the peripheral wall of the same. This dead air space serves as a cushion, to absorb and dampen out relatively high frequency noises originating in the air flow, and to also blanket a substantial portion of the peripheral housing wall to minimize rapid flow of air across the surface of the same. Likewise the baffle serves to reflect back into the dead air space, high frequency noises, which, in the absence of such a baffle, appear to be propagated in a strata of the discharging air stream adjacent the wall 17. The net result is that propagation of the undesired high frequency swishing noise through the conduit 16, is substantially entirely suppressed or minimized.

It will be evident that for a given speed of operation of the rotor, the presence of baffle 19 will slightly decrease the capacity of the blower. Such decrease in capacity can be compensated for by a slightly increased size of housing, to afford a larger cross sectional area for the discharge conduit 14, and by utilizing a slightly increased speed of operation for the rotor. In fact the speed of operation of the rotor can be increased more than sufficient to compensate for the presence of the baffle 19, to afford increased capacity, with substantially less airflow noise than would be occasioned without use of the baffle, and with the blower operating at reduced capacity.

As explained above, the majority of the noise which it is desired to suppress, appears to be confined to a strata of the discharging air stream, adjacent the wall 17. However, a certain amount of additional noise can be suppressed by the addition of side baffles 22, as shown in Figs. 4 and 5. These side baffles function in a manner similar to baffle 19, except that they create dead air spaces extending along the side walls of the housing.

It will be evident that the means which I have provided is quite simple in construction, and necessitates only slight additional expense in the construction of the blower. However, the results obtained constitute a remarkable improvement in the attainment of noiseless operation.

I claim:

1. In a blower of the character described, a spirally contoured conduit housing having a discharge conduit, one wall of the conduit being a tangential continuation of the outer peripheral wall of the housing, a rotor disposed within said housing, and means positioned within said conduit for minimizing airflow noise, said means comprising a baffle extending from said one wall into the stream of air discharging through the conduit, said baffle being inclined against the air flow and having a length sufficient to extend across said one wall.

2. In a blower of the character described, a spirally contoured conduit housing having a discharge outlet, one wall of the outlet being a tangential continuation of the outer peripheral wall of the housing, a rotor disposed within said housing, and means positioned within said conduit for minimizing airflow noise, said means comprising a baffle extending from said one wall into the stream of air discharging through the conduit, said baffle being inclined against the air flow at an angle of at least about 45° and having a length sufficient to extend across said one wall.

ERROLL C. FANNING.